United States Patent [19]

Stambaugh

[11] Patent Number: 5,166,882
[45] Date of Patent: Nov. 24, 1992

[54] SYSTEM FOR CALIBRATING A GYRO NAVIGATOR

[75] Inventor: John S. Stambaugh, El Toro, Calif.

[73] Assignee: The United States of America as represented by the Secretary of the Navy, Washington, D.C.

[21] Appl. No.: 349,381

[22] Filed: Mar. 31, 1989

[51] Int. Cl.[5] .................. G01C 21/00; G01C 19/38
[52] U.S. Cl. .................... 364/453; 33/324; 73/504
[58] Field of Search ............... 33/318, 317 R, 317 D, 33/320, 321, 326, 324; 73/504, 505; 364/453, 454

[56] References Cited

U.S. PATENT DOCUMENTS 4,303,978 12/1981 Shaw et al. .................... 364/453
4,320,669 3/1982 Grohe ............................ 73/504
4,379,365 4/1983 Riethmuller et al. ............ 33/324

Primary Examiner—David Cain
Attorney, Agent, or Firm—P. John Tarlano

[57] ABSTRACT

The present invention relates to a system for calibrating translation equations of a gyro navigator of a submarine. A value of velocity and a value of position of the submarine are produced by using values of acceleration sensed by accelerometers in the navigation gyro. The value of velocity and position are produced with the aid of the translation equations. This value of velocity and value of position are compared with a value of velocity and a value position as produced by a more accurate and independent source. A comparison is made with the aid of Kalman filter. Any difference obtained during a comparison is used in order to calibrate the translation equations of the gyro navigator.

4 Claims, 1 Drawing Sheet

SYSTEM FOR CALIBRATING A GYRO NAVIGATOR

BACKGROUND OF THE INVENTION

Brief Description of the Invention

The present invention relates to a system for calibrating translation equations of a gyro navigator of a submarine. A value of velocity and a value of position of the submarine are produced by using values of acceleration sensed by accelerometers in the navigation gyro. The values of velocity and position are produced with the aid of the translation equations. This value of velocity and value of position are compared with a value of velocity and a value position as produced by a more accurate and independent source. A comparison is made with the aid of Kalman filter. Any difference obtained during a comparison is used in order to calibrate the translation equations of the gyro navigator.

Brief Description of Prior Apparatus

In the past, values of acceleration of a submarine, as sensed by a gyro navigator, have been compared with independently determined more precise values of acceleration, in order to allow translation equations of a gyro navigator to be calibrated.

The use of values of acceleration for calibrating translation equations of a gyro navigator is not as reliable as the use of a value of velocity and a value of position for calibrating translation equations of gyro navigator. This is due to the fact that the values of acceleration are more noisy than a value of velocity and a value of position.

An object of the present invention is to provide a system for calibrating a gyro navigator.

SUMMARY OF THE INVENTION

A system for calibrating a gyro navigator of a submarine is disclosed. The system includes a gyro navigator for providing a a value of velocity and value of position of the submarine.

The system further includes a means of providing an independently obtained more precise value of velocity and value of position of the submarine.

The system still further includes a means for comparing the first value and the second value and for producing a set of differences in the value of velocity and value of position in order to allow the gyro navigator to be calibrated.

DESCRIPTION OF THE PREFERRED EMBODIMENT

Figure 1:
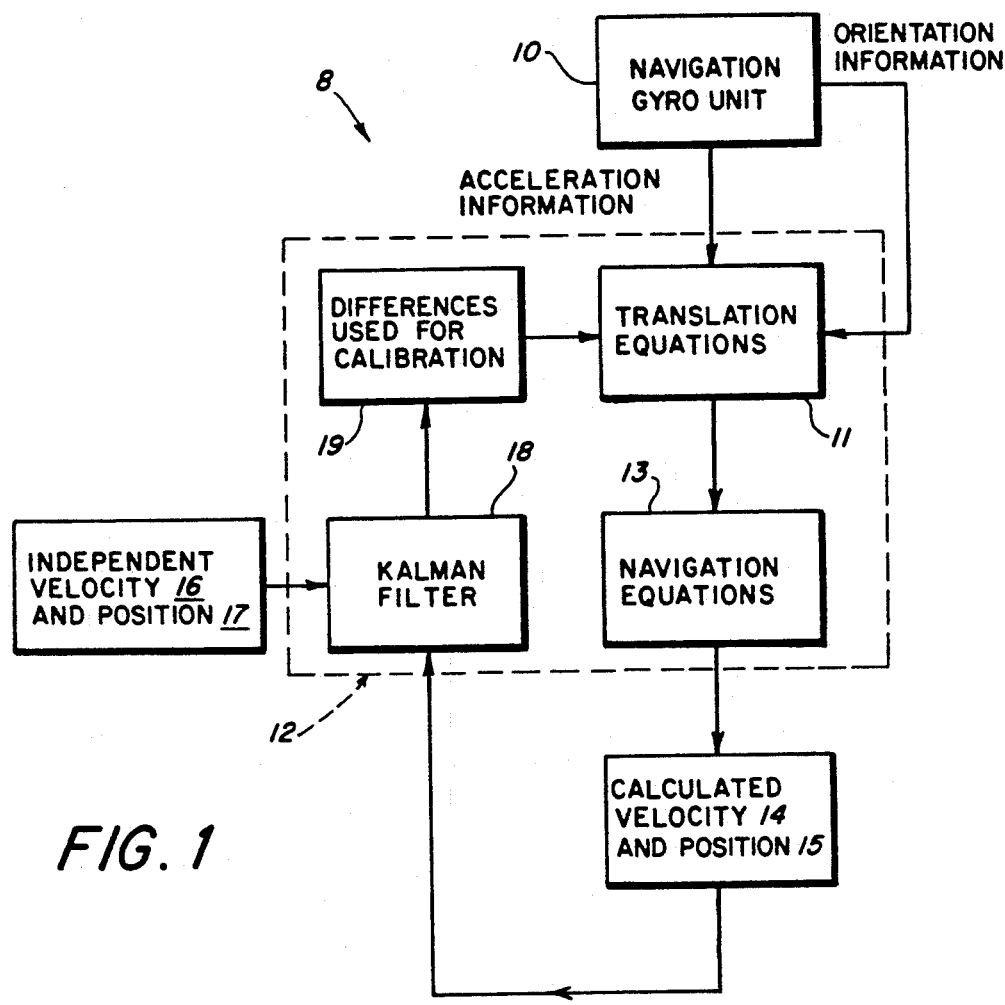
FIG. 1 is a block diagram of the system of the present invention.

FIG. 1 show gyro navigator 8. The gyro navigator 8 includes a navigation gyro unit 10. Such a gyro unit 10 consists of two space stabilized inertial gyros and three mutually orthogonal accelerometers. Such units are used in an inertial gyro navigator of a submarine. The gyros provide orientation information of themselves and of the accelerometers, relative to a platform such as a submarine. The accelerometers measure acceleration forces on themselves and on the gyros, as the submarine experiences accelerations due to its travel through the sea.

The acceleration forces are integrated into velocity information and is sent into navigation computer 12. The navigation computer 12 contains a set of translation equations 11. These equations are used to calculate changes in the velocity of the submarine. The orientation information from the gyros is also used by the translation equations. These translation equations 11 contain gyro error terms that correct the orientation information fed into equations 11.

The information on changes in velocities of the submarine is then sent into a series of programmed navigation equations 13. Equations 13 calculate an accurate value 14 of velocity and value 15 of position of the submarine. Values 14 and 15 are a result of the accelerations experienced by the submarine while it is in a certain orientation. However this value 14 of velocity and value 15 of position has some errors in it. These errors are due to imperfect gyro units 10 or due to unknown forces.

In order to compensate for the errors, the gyro error terms that are used in the translation equation 11, are corrected. The values of the gyro error terms can be calculated to a first approximation. However, in order that a more accurate value of velocity and of position may be obtained from the gyro navigator 8, the gyro error terms of the translation equations 11 are calibrated, or modified.

A very precise and independently determined value 16 of velocity and value 17 of position of the submarine are obtained for the purpose of calibrating the gyro error terms of the translation equations 11 of gyro navigator 8. Instruments, not shown, are used for the purpose of obtaining these very precise and independent values 16 and 17. These instruments can be placed on the submarine while the submarine is in port and above water. Alternatively, a very accurate independent measuring source, not shown, can be used to obtain values 16 and 17, when the submarine is at sea. The type of source may be one of many very accurate types.

The values 14 and 15 and the values 16 and 17 are sent into a Kalman filter 18. Kalman filter 18 may be implemented as a computer program in navigation computer 12. The Kalman filter 18 is based on a least square mathematical estimation technique. The Kalman filter 18 determines a set 19 of differences between the values 14 and 15 and the values of 16 and 17.

The set 19 is used to modify the gyro error terms of the translation equations 11, resulting in new gyro error terms. These new gyro terms replace the original gyro terms in the translation equations 11. Thus a calibrated gyro navigator 8A, shown in FIG. 2, is produced.

Figure 2:
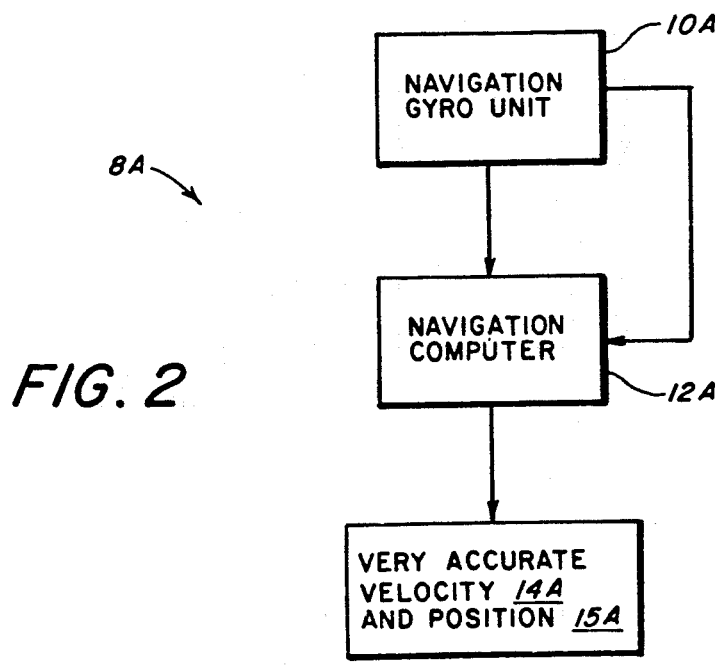
FIG. 2 is a block diagram of a calibrated gyro navigator.

The calibrated gyro navigator 8A, shown in FIG. 2, has improved translation equations in it. The calibrated gyro navigator 8A provides for a very accurate value 14A of velocity and value 15A of position of the submarine, over long periods of time. Those values 14A 15A will be closer to the independent set 16 and 17 shown in FIG. 1.

While the present invention has been disclosed in connection with the preferred embodiment thereof, it should be understood that there may be other embodiments which fall within the spirit and scope of the invention as defined by the following claims.

What is claimed is:

1. A system for improving the accuracy of a gyro navigator of a submarine comprising:
   (a) gyro navigator means for providing a first value of velocity Y and first value of and position of the submarine in relation to a fixed inertial reference frame;
   (b) means on the submarine for providing a second set of more precise independently determined value of velocity and position of the submarine in relation to a fixed inertial reference frame; and
   (c) means for comparing the first value and the second values and for providing a set of difference in the velocity and a difference in the value of position to the gyro navigator means to improve the accuracy of the gyro navigator means.

2. A system for improving the accuracy of a gyro navigator of a submarine, comprising:
   (a) a gyro navigatior having both gyros and and accelerometers therein, the gyros bein used for sensing the orientation of the accelerometers, and the accelerometers being used for sensing the acceleration forces on the submarine, the gyro navigator providing values of the orientation and acceleration;
   (b) a set of translation equations having gyro error terms therein for accepting the values of orientation and acceleration and for providing changes in velocity and position of the submarine;
   (c) a set of navigation equations for accepting the changes in velocity and position and for providing a calculated value of velocity and a calculated value of position of the submarine;
   (d) fourth means for providing more accurate independently determined value of velocities and positions of the submarine than the calculated velocities and positions of the submarine; and
   (e) fifth means for comparing the calculated value of velocity and calculated value of position and the independent velocity and a position for providing differences between the calculated and independent values of velocity and position, in order to calibrate the gyro error terms, so that velocity of and position that are produced by the gyro navigator are more accurate.

3. The calibration system of claim 2 wherein the fifth means is a Kalman filter.

4. The calibration system of claim 3 wherein the Kalman filter, the set of translation equations and set of navigation equations are built into a navigation computer.

* * * * *